United States Patent Office 3,453,775
Patented July 8, 1969

3,453,775
METHOD FOR IMPROVING THE DEVELOPMENT AND GROWTH CHARACTERISTICS OF SEED BEARING PLANT LIFE
R. Louis Ware, 2108 Middlefork Road, Northfield, Ill. 60093
No Drawing. Continuation-in-part of application Ser. No. 537,294, Mar. 25, 1966. This application Apr. 8, 1968, Ser. No. 719,750
Int. Cl. A01c *1/00;* A01g *7/00*
U.S. Cl. 47—58                          13 Claims

ABSTRACT OF THE DISCLOSURE

The method of improving the development and growth characteristics of seed bearing plant life that comprises subjecting the plant life to environmental pressure alternated in an artificially controlled cycle.

---

This application is a continuation-in-part of application Ser. No. 537,294, filed Mar. 25, 1966, and now abandoned.

The present invention relates to a method for improving the development and growth characteristics of seed bearing plant life and more particularly to an improved method for treating plant life during some period of its life cycle which advantageously improves its rate of growth, nutrient utilization, and the like.

Different types of plant life are characterized by relatively unique adaptive capabilities with respect to environmental conditions of nutrients, commonly provided by soil, humidity, temperature and the like. It is generally on the basis of such adaptive characteristics that a selection is made of a particular type of a plant life over another since conditions which obtain in nature differ widely from location to location. Due to limitations on their adaptation, types of plant life which, in view of their ultimate characteristics, are more desirable often have to be passed over in favor of less attractive but more adaptable plants.

Numerous and widely varying approaches have been suggested to overcome the problems posed by such limitations on the adaptive capabilities of such more desirable but normally non-useful forms of plant life. As would be expected, the approach taken with respect to a particular plant is aimed primarily at eliminating the basis for the specific limitation on its use which may involve an alteration of the nature of the plant itself, such as is followed in the development of hybrids, or an alteration of one, or even all, of the environmental conditions which normally occur at a particular location. In such latter approaches fall the use of fertilizers, insecticides, fungicides, herbicides, growth promoting agents and the like, and the utilization of greenhouses and the like wherein the growth promoting environment is completely controlled.

Even in some instances wherein the approach at promoting the growth characteristics of a particular plant is successful, the expenditures in terms of requisite materials, treatment, and the like, render the approach economically unfeasible. The need for further improvements in techniques for achieving increased plant production, particularly from a standpoint of plants which serve as a source of food, is further aggravated by the mushrooming number of humans and animals in the world with an attendant decrease in available land resources. Hence, the search has continued in the art for new approaches for improving the growth characteristics of plant life.

Accordingly, it is the primary object of the present invention to provide a method for improving the development and growth characteristics of plant life.

An additional object of the present invention is to provide a simple method which advantageously is useful to improve in an efficient and economical manner the growth characteristics of plant life.

Another object of the present invention is to provide a method whereby the development and growth rate of plant life advantageously is accelerated.

An additional object of the present invention is to provide a method for improving the efficiency of nutrient utilization of plants.

Yet another object of the present invention is to provide a method for treating plant life during at least a portion of its life cycle, including germination and emergence, wherein the treatment is carried out under controlled conditions of temperature, humidity, pressure and the like to advantageously improve the plant's growth characteristic.

A particular object of the present invention is to provide a method for treating plant seeds to improve the rate of germination and emergence of the seeds.

Another particular object of the present invention is to provide a method for treating a given batch of plant seeds to improve the uniformity of their germination and emergence.

A further particular object of the present invention is to provide a method for treating rooted plants during their growth period to accelerate their rate of growth and shorten the total time period required for achieving maturity.

Broadly described, the present invention provides a method for improving the development and growth characteristics of seed bearing plant life which comprises subjecting said plant life to pressure alternating in an artificially controlled pattern between values having a pressure differential therebetween of at least about 0.15 inch of mercury.

It is to be understood that the term "plant life" as employed herein is intended to refer to all forms assumed by a plant during its development and growth cycle. Hence, as employed herein, the term "plant life" refers to seeds as well as to rooted plants.

The method of the present invention when applied in the treatment of seeds advantageously increases the rate at which the seeds germinate and emerge. For example, red salvia seeds and parsley seeds which normally require on the order of 15 and 24 days for germination respectively, when treated in accordance with the present method may be caused to germinate within about 6 and about 8 days respectively. Batches of seeds treated in accordance with the present method moreover, advantageously germinate and emerge more uniformly than those not so treated.

When applied to rooted forms of plant life, the method of the present invention significantly improves the growth rate of the plant as compared to that of a plant subjected to naturally occurring pressure conditions. The present treatment also advantageously improves the efficiency of the plant to utilize nutrients taken up by the plant through its roots. A characteristic of plants treated by the present method is a healthy, fully developed and efficient root system.

The precise reason why the alternating pressure treatment of the present method is effective in improving the development and growth of plant life is not known. It is felt, however, that the rhythmic variation in pressure carried out in accordance with the present method supplements the natural agencies effecting the response of the plant life to assimilate vital gases as described below.

In the case of seeds, germination is effected by oxygen and water penetrating the protective outer envelope of the seeds. The pressure treatment of seeds in accordance with the present method is thought to facilitate the passage of the germination-promoting materials through the seed shell.

For their growth, rooted plants require from outside sources hydrogen, oxygen, carbon, nitrogen, and in smaller amounts, minerals. The roots of plants are capable of delivering all of the necessary ingredients with the exception of carbon. A plant is capable of using only gaseous forms of carbon. This is accomplished by the plant drawing upon the small amount of carbon dioxide present in the atmosphere. The carbon dioxide and water taken up in the plant are converted into sugar (which the plant later consumes) by a process known as photosynthesis. The reaction requires light as a catalyst and produces oxygen as a by-product. The plant therefore to be functioning properly must provide for transmission of such gases. In a plant, sites at which photosynthesis occurs are provided by cells in the leaves of the plant. For an illustration of a typical plant leaf cell arrangement see Manning, How and Why of Better Gardening, D. Van Ostrand Co., Inc. New York, 1951 at pages 66 et seq. These leaf cells communicate with the atmosphere through minute openings called stomata which serve as conduits through which carbon dioxide enters the plant and by-product oxygen is expelled. During the time period in which photosynthesis is taking place in the plant, i.e., during periods in which the plant is exposed to the requisite light, both carbon dioxide and oxygen pass countercurrently through the stomata by diffusion. Accordingly, the leaf cells under normal conditions are never exposed to a highly rich stream of reactant carbon dioxide. It is thought that when subjected to the rhythmic pressure treatment of the present invention, the "respiration" of gases to and from the plant cells is improved and growth is accelerated.

The present invention is generically applicable to the treatment of any type of seed bearing plant life. The term "plant life" is used in its ordinary sense and is characterized, inter alia, by an ability to form carbohydrates photosynthetically through the action of chlorophyll.

Plant life ultimately desired to be employed by virtue of its food value, ornamental beauty, and the like is contemplated. The particular form of the plant life being treated is not critical. It may be in the form of a seed, seedling, bulb, rooted plant, and the like. The invention in certain preferred embodiments in particularly useful in promoting the germination of seeds wherein ordinarily germination and emergence are difficult to achieve, and in the growth of plants known to be sensitive with respect to environmental changes and require special control procedures to be followed to obtain them in the desired condition. Specific examples of plant life contemplated for treatment include without limitation vegetables such as radishes, onions, spinach, lettuce, carrots, turnips, tomatoes, swiss chard, kohlrabi, beans, parsley, peas, squash, etc.; fruits such as straberries, raspberries currants, blueberries, gooseberries; flowers such as red salvia, poinsettias, zinnias, daisies, larkspur, columbine, delphinium, petunias, marigolds, roses, lilies, tulips, violas, crocus, etc.; and cereal grains and field crops such as rice, wheat, barley, oats, corn, cotton, sunflower, tobacco, etc.

In accordance with the present method the magnitude of the pressure differential achieved in the alternating of the pressure is at least about 0.15 inch of mercury. Generally pressure differentials employed are in the range of from about 0.20 to about 4.0 inches of mercury. While pressure differentials above four inches of mercury, i.e., ranging up to one atmosphere and higher are contemplated for use, they are less preferred for utilization in that they do not provide an appreciable further improvement and are not as easily adapted to processing equipment as the smaller differentials.

The order of magnitude of the pressures employed in the present method may vary. The invention contemplates carrying out the described treatment employing only either subatmospheric pressures or superatmospheric pressures, or alternatively a combination of normal atmospheric presusre (i.e., ambient pressure at ground level) with either a pressure which is higher or a pressure which is lower than the normal atmospheric pressure. In the preferred embodiments of the invention, one of the pressures employed is the normal atmospheric pressure.

In accordance with the present method the frequency at which the pressure is alternated suitably may vary over a relatively wide range. The time periods employed in alternating the pressure generally are in the range of from about 0.2 second to about four hours, preferably from about 0.3 second to about one hour. Longer alternating times, i.e., ranging up to and over six hours, while also contemplated for use, are less preferred in that the effects achieved thereby are relatively less significant than those obtained by the use of the shorter alternating times. During a complete cycle of the pressure alternation, the time periods during which the plant life is subjected to each of the differing pressures may be the same or different. Usually the total cycle employed subjects the plant life being treated to the higher of the pressures employed in the process for at least about 10%, and preferably at least about 25% of the total cycle time. The alternation of the pressures suitably may be gradual or take place rapidly.

The method of the present invention may be carried out in equipment having a widely varying design. The particular mode of achieving the described environmental pressure alternation is not critical. In the treatment the plant life may be maintained stationary or moved by conveying means intermittently or continuously. A single treating chamber or at least two separate chambers may be employed. The pressure of a given treating environment may be that which is ambient for the location of the treatment zone such as the pressure which exists for the particular elevation of the treating zone, or the pressure which obtains may have been induced by conventional mechanical means, such as a vacuum pump, blower, and the like.

One means by which the method of the present invention may be carried out entails the utilization of at least two separate treating chambers which, by reason of their relative vertical positioning or by mechanical means, are maintained at pressures having the described pressure differential therebetween. The plant life desired to be treated is supported in a suitable container containing nutrients and the like where required, and is passed alternately from one treating chamber to another at the particular frequency employed by any conventient conventional conveyor system.

The method of the present invention is particularly adapted to be carried out in equipment of the type comprising a transparent housing adapted with a rotating conveyor system by which plant life alternately is conveyed vertically and/or horizontally through at least two treating zones having the described pressure differential therebetween and located within the housing.

In one aspect of such an equipment design, the transparent housing is characterized by such a vertical dimension that merely repeatedly conveying the plant life over at least a portion of the total height of the housing with the rotating conveyor system achieves the requisite alternating pressure treatment without the need for providing mechanical means for alternating pressure. In such embodiment it is required that the plant life be rotated within the housing over a vertical distance requisite to subject the plant life to the minimum 0.15 in. mercury pressure differential. In particular embodiments the actual vertical distances required depend on the altitude of the equipment sites and generally are at least about 175 feet. Equipment designs are contemplated wherein the vertical distance of travel within a housing of the plant life is above about 200 feet and ranges up to and exceeds 500 feet.

Transparent housing of the above-described vertical type which are adapted with mechanical means which serve as the sole or a supplemental means for effecting the described pressure alternation also suitably may be employed in carrying out the present method. In such embodiments the vertical path of travel of the plant life may be significantly shorter such as in the range of from about 10 to about 150 feet. Mechanical means for achieving at least a portion of the pressure alteration also may be employed in the described taller housings.

The adaptation of the present method to such vertical transparent housings, which generally are closed, provides significant advantages since the housings also may be provided with means for controlling atmospheric composition, temperature, humidity, light, and the like in addition to the means provided for achieving the described pressure control. Plant life therefore may be developed and grown in such housings the year around without regard to climatic changes. Such housings furthermore by virtue of their compact nature, particularly those of a more significant height, allow the desired development and growth of plant life to be carried out with a more efficient use of available land. Since nutrients conveniently and efficiently may be supplied to the plant life being treated in the receptacles in which the plant life is supported for conveyance by the transporting system, the method of the invention adapted to such housings renders possible development and growth of needed and desirable quantities of plant life even in areas wherein the nature of the soil does not support plant growth.

It will be evident to those skilled in the art that the treatment to which plant life is subjected by means of the use of the method of the present invention is not to be confused with the effects on plant life exerted by natural atmospheric conditions. In contradistinction to the naturally occurring atmospheric changes which occur randomly and in a haphazard manner over normally long periods of time, the pressure alteration according to the present method involves a rhythmic cycling of the pressure to which the plant life being treated is subjected at frequencies which are abnormally short.

The invention having been described in detail, the following examples are given to demonstrate specific embodiments thereof. It will be understood that the examples are given merely for illustrative purposes and not by way of limitation.

EXAMPLE I

A sample of lettuce seed is divided in half. Each of the seed samples is grown to maturity in soil from a common source in a propagating case wherein the temperature is controlled to be in the range of 57 degrees to 60 degrees F. during the day and 47 degrees to 50 degrees F. at night. The relative humidity is maintained at 90+%. The samples are watered daily with 8-20-20 soluble fertilizer solution. The pressure to which one sample is subjected throughout its entire growth is ambient. This sample serves as the control. The other lettuce sample is subjected by means of a fan to a static increase in pressure above ambient ranging between about 0.2 and about 0.5 inch mercury for continuous 30 minute periods of every hour. At the end of 55 days the samples are compared. The lettuce obtained which has been subjected to the alternating pressure treatment of the method of the invention has grown considerably more than the control lettuce and has a more attractive appearance.

EXAMPLE II

Two cuttings from the same mature poinsettia plant are rooted in sand and then transferred to a growing medium including a 3:1 mixture by weight of fibrous loam and sand and containing one pound of superphosphate per bushel. The rooted plants are grown in a greenhouse in which the temperatures are controlled at 70 degrees to 75 degrees F. during the day and at 60 degrees to 65 degrees F. at night. The relative humidity is controlled at 70%. The plants were watered daily with 8-20-20 soluble fertilizer solution. Artificial shading means are provided so that the plants are never subjected to more than eleven hours sunlight per day. One poinsettia plant is subjected only to ambient pressure and serves as the control. By means of a louvered fan adapted with a control arrangement for opening and closing the louvers, the other poinsettia sample every ten seconds is subjected for four seconds to a static pressure increase above ambient which ranges between about 0.3 and 0.6 inch mercury. At the end of 180 days the mature poinsettia plants obtained are compared. The poinsettia which has been subjected to the alternating pressure treatment in accordance with the present method is significantly larger and more attractive than the control plant.

The following examples were conducted in 1' x 1' x 4' long growth chambers, equipped with two overhead fluorescent tubes having light frequency peaks at about 4,400, 5,300, and 6,600 Angstroms (Standard "Gro-Lux" tubes manufactured by Sylvania). The fluorescent tubes provided approximately 600 foot candles illumination at plant level. Both chambers were equipped with a thermometer, barometer, and a shallow full-length pan filled with gravel which contained water to a level slightly below the upper gravel level. The chamber used to grow control plants was equipped with a 1/25 H.P. squirrel cage blower, was equipped with an air opening at the end opposite the blower, and was equipped with baffles to prevent an excessive artificial "wind" effect. The growth chamber employed for the test plants was equipped with a turbine vacuum pump. Containers 4½" x 6" x 2" deep were used for multiple plants, while containers 1¾" x 1¾" x 1¾" were used for single plants. The growth medium for the plants consisted of a mixture of peat and particulate calcined clay which was moistened with a nutrient solution containing 200 p.p.m. of a soluble 20-20-20 NPK fertilizer. The fertilizer contained ammonium nitrate, ammonium phosphate, sulfate of potash, and trace minerals ("Kapco 20-20-20" manufactured by Kapco Fertilizer Company).

The tests were conducted using a pressure variation of about 1" of mercury, with the higher pressure (atmospheric) maintained for 7½ minutes and the lower pressure for 2½ minutes. The temperature was maintained at 80° F. (±2° F.) for both test and control runs. It was necessary to provide auxiliary heating means for the test chamber whereas the fluorescent lights provided enough heat to maintain the temperature of the control chamber. The lights were on continuously and the plants were watered with the fertilizer solution daily. If the soil surface appeared to be dry, a second watering was employed each day. The blower on the control operated during the same periods that the vacuum pump operated to insure a change of atmosphere in the control tests.

EXAMPLE III

Seed germination test

Item tested: Sunflower
No. of seeds: ½ oz. seed each sample

Test sample

Planting date: 1/23
Splitting of seed coat: (1/25), 20%; (1/26), 85%; (1/27), complete
Emergence of Hypocotyl: (1/26), 50%; 1/27), complete
Emergence of Epicotyl: (1/26), 25%; (1/27), complete
Emergence of Cotyledon: (1/26), 25%; (1/27), complete Control sample Planting date: 1/23
Splitting of seed coat: (1/25), N.S.;[1] (1/26), 20%; (1/27), 25%; (1/29), complete
Emergence of Hypocotyl: (1/26), 10%; (1/27), 50%; (1/29), complete
Emergence of Epicotyl: (1/26), 3½%; (1/27), 60%; (1/29), complete
Emergence of Cotyledon: (1/26), N.S.; (1/27), 50%; (1/29), complete

[1] N.S.—not significant.

Sunflower seedling growth

Planted: 1/23
½ ounce of seed for each sample

TEST SAMPLE

| Date | Leaf Length, Inches (average) | Plant Height, Inches (average) |
|---|---|---|
| 1/30 | ⅞ | 4¼ |
| 1/31 | 1⅛ | 5½ |
| 2/2 | 1¼ | 6½ |

CONTROL SAMPLE

| Date | Leaf Length, Inch (average) | Plant Height, Inches (average) |
|---|---|---|
| 1/30 | ⅝ | 3½ |
| 1/31 | ¾ | 4 |
| 2/2 | ⅞ | 5 |

Lack of pressure between 1/27 and 1/29 due to warping of pressure chamber had enabled control sample to progress at an incremental rate almost equal the test sample, but 24 hours of pressure restored vigor of test pressurized sample. Note rapidity of effect.

Sunflower seedling fresh weight

Test sample: Fresh weight, net 20.60 grams
Control sample: Fresh weight, net 15.79 grams
Net weight change: 4.81 grams; 30.5%

EXAMPLE IV

Seed germination test

Item tested: Oats
No. of seeds: ½ oz. seed for test and control

Test sample

Planting date: 1/6
Splitting of seed coat: (1/8) comp.
Emergence of Hypocotyl: (1/8), 65%; (1/9) comp.
Plant height: (1/12), 6" avg. ht.; (1/15), 7" avg. ht.

Control sample

Planting date: 1/6
Splitting of seed coat: (1/8), 20%; (1/9), comp.
Emergence of Hypocotyl: (1/8), 5%; (1/10), comp.
Plant height: (1/12), 5" avg. ht.; (1/15) 6" avg. ht.

Leaf development on pressure samples was much broader (approximately ⅓ wider). Root development was heavier on pressure test samples than on control samples.

EXAMPLE V

Seed germination test

Item tested: Petro hybrid squash
No. of seeds: 6 in each test

Test sample

Planting date: 1/8
Epicotyl emerged: (1/12), 4 plants; (1/15), 5 plants; (1/16), 5 plants
Cotyledon emerged: (1/15), 3 plants; (1/16), 3 plants, 2" ht.

Control sample

Planting date: 1/8
Epicotyl emerged: (1/12), 1 plant; (1/15), 2 plants; (1/16), 3 plants
Cotyledon emerged: (1/15), 1 plant; (1/16), 1 plant
Transplanted January 17.

Pressurized test samples grew so rapidly that containers were too small. Transplanting was attempted, but shock set back plants, making further testing inconclusive, with the exception of the following:

1st true leaves appeared on test plants on 1/17;
1st true leaves appeared on control plants on 1/19.
The average length of 1st true leaves on test plants was ½".
The first true leaves on the control plants on 1/19 were not measurable.
2nd true leaves appeared on test plants 1/19.
2nd true leaves appeared on control plants 1/20.

COMPARISON OF WEIGHT GAIN.—PETRO HYBRID SQUASH AFTER 15 DAYS' GROWTH FROM SEED

| | Total Weight | Leaves and Stem | Cotyledon | Roots |
|---|---|---|---|---|
| Pressure Test Samples, grams | 18.54 | 8.88 | 7.57 | 2.09 |
| Control Samples, grams | 12.16 | 2.57 | 7.82 | 1.77 |
| Weight Gain: | | | | |
| Test vs. Control, grams | +6.38 | +6.31 | −0.25 | +0.32 |
| Percent Gain | +52 | +246 | −0.3 | +18 |

A total of 4 samples each for test and for control were used.

DATA ON PLANTS IN SQUASH PETRO HYBRID TEST MEASURED AFTER 15 DAYS OF GROWTH FROM SEED

Test samples

Leaf lengths:

Plant No. 1: 4 leaves on plant, measuring ⅛", ⅞", 1½", and 2⅞".
Plant No. 2: 6 leaves on plant measuring ⅛", ½", ½", ⅞", 1" and 1".
Plant No. 3: 8 leaves on plant, measuring ¼", ¼", ½", ½", ¾", ⅞", 1" and 1".
Plant No. 4: 6 leaves on plant, measuring ¼", 1½", 2½", 2½", 3", and 3½", with a visible flower bud.
Plant No. 5: 6 leaves on plant, measuring ¼", ¼", ⅞", 1¾", 2½", and 4½", with visible flower bud.

Control samples

Leaf lengths:

Plant No. 1: 2 leaves on plant, measuring ⅛" and ⅜".
Plant No. 2: 4 leaves on plant, measuring ⅜", ⅜", ½", and ⅞".
Plant No. 3: 4 leaves on plant, measuring ⅜", ⅜", ⅝", and ⅞".
Plant No. 4: 4 leaves on plant, measuring ¼", ¼", ⅞", and ⅞".
Plant No. 5: Did not germinate.

EXAMPLE VI

Seed germination test

Item tested: Chantryland viola
No. of seeds: 200 in each test

Test sample

Planting date: 1/9
Splitting of seed coat: (1/10), start; (1/12), comp.
Emergence of Hypocotyl: (1/12), 72%; (1/15), complete
Emergence of Epicotyl: (1/12), 60%; (1/15), complete
Emergence of Cotyledon: (1/15), complete Control sample Planting date: 1/9
Splitting of seed coat: (1/12), start; (1/15), comp.
Emergence of Hypocotyl: (1/12), 16%; (1/15), 80%; (1/16), complete
Emergence of Epicotyl: (1/12), 9%; (1/15), 59%; (1/16), complete
Emergence of Cotyledon: (1/16), 0%; (1/17), 2.5%

The pressurized samples showed increased germination and more rapid hypocotyl emergence. At conclusion of test, pressurized samples showed strong chlorophyll formation in contrast to control, which was just beginning to green up when experiment terminated.

EXAMPLE VII

Seed germination test

Item tested: Tendergreen beans
No. of seeds: 6 in each test

Test sample

Planting date: 1/25
Epicotyl emerged: (1/27), 1 plant; (1/29), 6 plants, ½″ ht.
Cotyledon emerged: (1/30), 6 plants, 1″ ht.
First true leaves: (1/31), 6 plants, 3″ ht.

Control sample

Planting date: 1/25
Epicotyl emerged: (1/27), N.S.; (1/29), 6 plants, ht. N.S.; (1/30), 6 plants, ht. N.S.
Cotyledon emerged: (1/30), 1 plant, ht. N.S.; (1/31), 1 plant, ½″ ht.
First true leaves: (1/31), 2 plants, 1″ ht.; (2/1), 6 plants, 1¾″ ht.

One plant in pressurized test showed thresher injury on cotyledons, limiting average height. Seedlings in both sets were at least two weeks ahead of an outdoor seeding under optimum conditions.

EXAMPLE VIII

Seed germination test

Item tested: Dekalb Tybrid Corn
No. of seeds: 12 in each test

Test sample

Planting date: 1/12
Emergence of Epicotyl: (1/17), 41.5%, ¼″ ht.; (1/20), 91.5%, 4″ ht.; (1/22), 91.5%, 6½″ ht.

Control sample

Planting date: 1/12
Emergence of Epicotyl: (1/17), 41.5%, ⅛″ ht.; (1/20), 83.5%, 2½″ ht.; (1/22), 83.5%, 3¾″ ht.

The pressurized samples showed superior vigor and better color up to last day of test, when the ability of limited soil volume to support plants began to show in leaf tips.

EXAMPLE IX

Tomato plant test

No. of plants: 4 in each sample

PRESSURE TEST SAMPLE

| Date | Height of Plants, Inches | Average Height, Inches | Average No. of Leaves |
| --- | --- | --- | --- |
| 1/4 | 1–3<br>2–3½<br>1–2 | 3 | 3 |
| 1/6 | 1–4<br>1–4½<br>1–5 | 4.1 | |
| 1/8 | 1–3<br>1–6<br>1–7<br>1–7<br>1–3½ | 5.9 | 5 |
| 1/10 | All plants reaching lights and bending. No accurate measure. All 10½″ or over. | | 1 9 |

CONTROL SAMPLE

| Date | Height of Plants, Inches | Average Height, Inches | Average No. of Leave |
| --- | --- | --- | --- |
| 1/4 | 1–3<br>1–3¼<br>1–2½<br>1–2¾ | 2.9 | 3 |
| 1/6 | 1–4<br>1–4<br>1–3½<br>1–2 (?) | 3.9 | |
| 1/8 | 1–5<br>1–5<br>1–4½<br>1–4 | 4.8 | 3 |
| 1/10 | | 7.2 | 7 |

¹ Average.

Uniform plants were not available, but averaged as closely as possible. All had 3 true leaves at beginning of test, and were visibly equal in condition.

EXAMPLE X

Seed germination test

Item tested: Cotton
No. of seeds: 12 in each sample

Test sample

Planting date: 2/2
Epicotyl emerged: (2/5), 8 plants; (2/6), 10 plants; (2/7), 11 plants
Cotyledon emerged: (2/6), 5 plants; (2/7), 7 plants; (2/8), 7 plants, 1½″ ht.

Control sample

Planting date: 2/2
Epicotyl emerged: (2/5), N.S.; (2/6), 7 plants; (2/7), 5 plants; (2/8), 5 plants
Cotyledon emerged: (2/6), N.S.; (2/7), N.S.; (2/8), 2 plants, ¾″ ht.

EXAMPLE XI

The above procedure was repeated with Dekalb Hybrid Corn, except that a cycle of 0.5 inch of mercury for 2½ minutes and normal pressure for 5 minutes was employed on a continuous basis for 10 days. The Control was maintained in a comparable chamber and temperature, but without a change in pressure. A total of eleven samples each for the Test and for the Control provided the following weight gain data.

COMPARISON OF WEIGHT GAIN.—CORN, AFTER 10 DAYS' GROWTH

| | Total Weight | Leaves | Cotyledon and Roots |
| --- | --- | --- | --- |
| Pressure Test Samples, grams | 22.0 | 10.2 | 11.8 |
| Control Samples, grams | 17.7 | 8.6 | 9.1 |
| Weight Gain Test to Control, grams | +4.3 | +1.6 | +2.7 |
| Percent Gain | +24.3 | +18.6 | +29.7 |

EXAMPLE XII

The procedure of Examples III–X was repeated with Red Monarch Petunias. Seeds were sown in a synthetic soil mixture in 1¾″ plastic pots, and after about 20 days 4 plants were selected on the basis of uniformity. Each had 6 leaves averaging ¾" long. The following results were obtained:

PRESSURE SAMPLES

| Plant No. 1 | Plant No. 2 |
|---|---|
| Days in Test: | |
| 10 — 12 leaves, average length 1¼". | 11 leaves, average length 1½". |
| 19 [1] — 16 leaves; longest 2". | 14 leaves; longest 2⅛". |
| 27 — 11 buds, 3 open, 2 showing color. | 8 buds, 1 open, 2 showing color. |

CONTROL SAMPLES

| Plant No. 3 | Plant No. 4 |
|---|---|
| Days in Test: | |
| 10 — 10 leaves, average length 1". | 9 leaves, average length 1". |
| 19 [1] — 12 leaves; longest 1½". | 10 leaves; longest 1¾". |
| 27 — 5 buds, none open, 1 showing color. | 9 buds, none open, none showing color. |

[1] Transplanted to larger (3") pots because plants were producing rosettes and needed more room.

EXAMPLE XIII

Six Test Red Monarch Petunia plants and Six Control Red Monarch Petunia plants were grown according to the procedure of Examples III–X. After 1 month the Test samples had an average leaf spread of slightly over 3½" whereas the Control samples had an average leaf spread of 2¼". Test plants had a total leaf area of 91.25 square inches as compared to 40.875 square inches for the Control.

I claim:

1. A method for improving the development and growth characteristics of seed bearing plant life which comprises subjecting said plant life to an environmental pressure alternating in an artificially controlled cycle between values having a differential therebetween of at least about 0.15 inch of mercury whereby the development of said plant life is improved.

2. The method according to claim 1 wherein said plant life is in the form of a seed.

3. The method according to claim 1 wherein said plant life is in the form of a rooted plant.

4. The method according to claim 1 wherein said plant is stationary.

5. The method according to claim 1 wherein said plant moves through a vertical distance of at least about 175 feet.

6. The method according to claim 1 wherein said pressure differential is at least about 0.2 inch of mercury.

7. The method according to claim 1 wherein one pressure employed in said alternating of pressure is normal atmospheric pressure.

8. The method according to claim 6 wherein said plant life is a vegetable.

9. The method according to claim 6 wherein said plant life is an ornamental.

10. The method according to claim 6 wherein said plant life is a cereal grain.

11. The method according to claim 6 wherein the frequency at which said plant life is subjected to said alterations in pressure is in the range of from about 0.2 second to about 4 hours.

12. The method according to claim 1 wherein said pressure differential is, at least in part, induced by mechanical means.

13. The method according to claim 1 wherein said pressure differential is induced by mechanical means.

References Cited

UNITED STATES PATENTS

| | | | |
|---|---|---|---|
| 1,648,257 | 11/1927 | Burke | 47—58 |
| 1,793,626 | 2/1931 | McCormick | 47—17 |
| 1,827,530 | 10/1931 | Le Grand. | |
| 3,254,447 | 6/1966 | Ruthner | 47—1.2 |

ROBERT E. BAGWILL, *Primary Examiner.*

U.S. Cl. X.R.

47—17